Dec. 5, 1933.  N. C. AMEN  1,938,002
ILLUMINATING APPLIANCE
Filed April 2, 1932   2 Sheets-Sheet 1
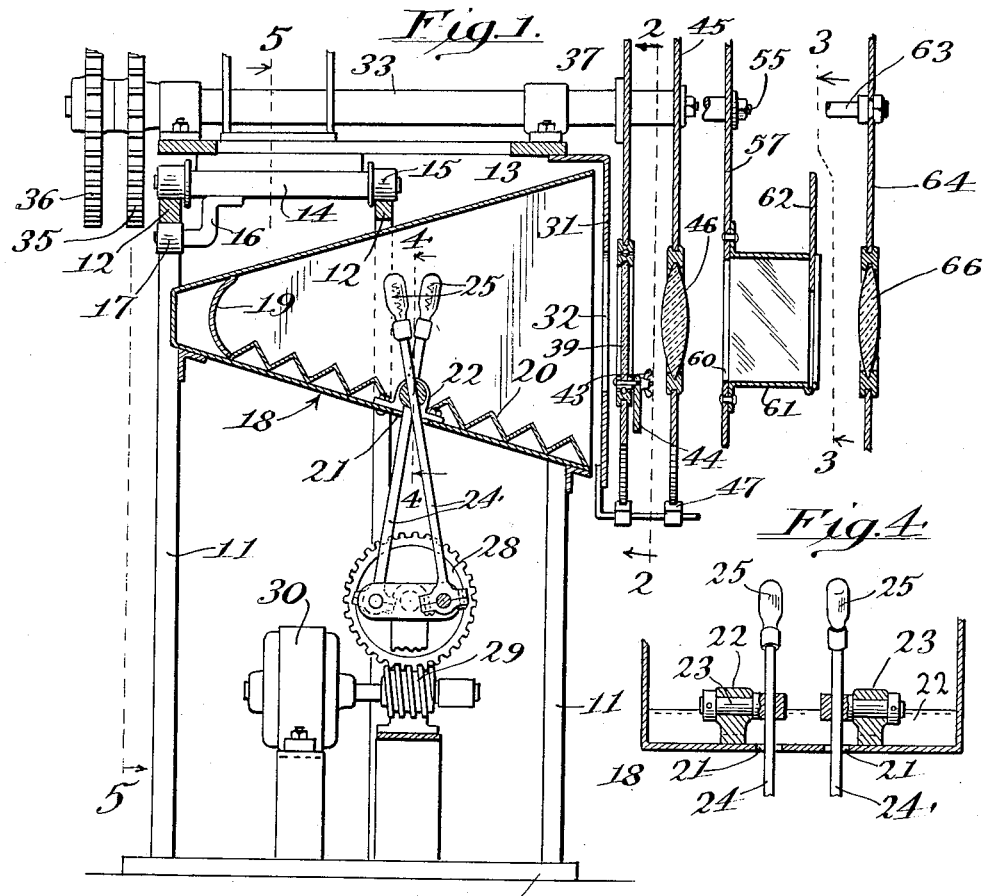
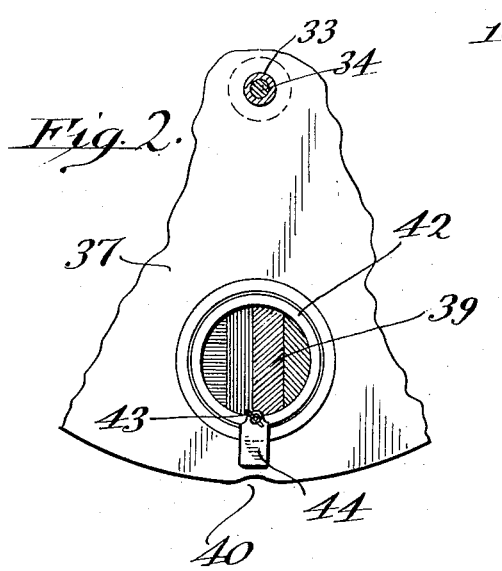
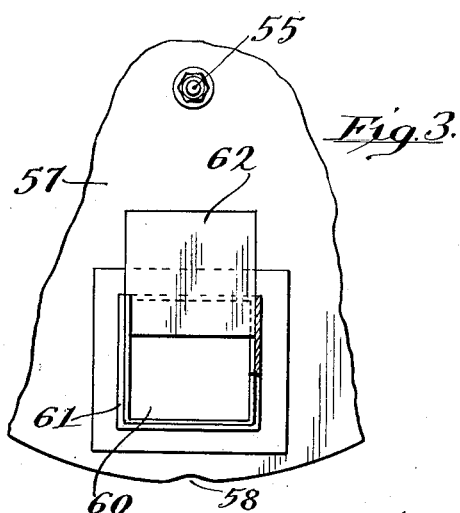
Inventor
N. C. Amen
By Martin P. Smith
Attorney Dec. 5, 1933.                    N. C. AMEN                    1,938,002
                          ILLUMINATING APPLIANCE
                            Filed April 2, 1932            2 Sheets-Sheet 2

Inventor:
N. C. Amen.
by Martin P. Smith
Attorney.

Patented Dec. 5, 1933

1,938,002

UNITED STATES PATENT OFFICE 1,938,002

ILLUMINATING APPLIANCE

Nicholas C. Amen, Los Angeles, Calif.

Application April 2, 1932. Serial No. 602,743

18 Claims. (Cl. 240—3.1)

My invention relates to an illuminating appliance of the general type disclosed in U. S. Letters Patent No. 1,791,697, issued to me February 10, 1931, and the principal object of my present invention is, to generally improve upon and simplify the construction of the illuminating appliance disclosed in my patent aforesaid as well as other existing forms of illuminating appliances.

Further objects of my invention are, to provide an illuminating appliance wherein differently colored rays of light may be projected from the apparatus for the purpose of illuminating in an attractive manner, displays of goods or articles displayed for sale in show windows, show cases and the like, further, to provide an illuminating appliance that may be conveniently employed in the illumination of the theaters and the like for the illumination of sets used in stage, also for the illumination of sets used in the production of motion pictures and also for the flood lighting of buildings.

A further object of my invention is, to provide an illuminating appliance that includes reflectors, moving lamps that are arranged for operation adjacent to the reflectors, sections of colored transparent material through which pass the direct and reflected rays of light from the lamps and lenses which focus the rays of light on the objects or areas that are to be illuminated.

A further object of my invention is, to provide a mechanically operated illuminating appliance having means whereby the projected light rays may be readily controlled and caused to change color and to increase or decrease in intensity at periodic intervals.

With the foregoing and other objects in view, my invention consists in certain novel features of construction and arrangement of parts that will hereinafter be more fully described and claimed and illustrated in the accompanying drawings in which:

Fig. 1 is a vertical section taken through the center of an illuminating appliance constructed in accordance with my invention.

Fig. 2 is a detail section taken on the line 2—2 of Fig. 1.

Fig. 3 is an elevational view looking in the direction indicated by the arrow 3 in Fig. 1.

Fig. 4 is a detail section taken on the line 4—4 of Fig. 1.

Figure 5:
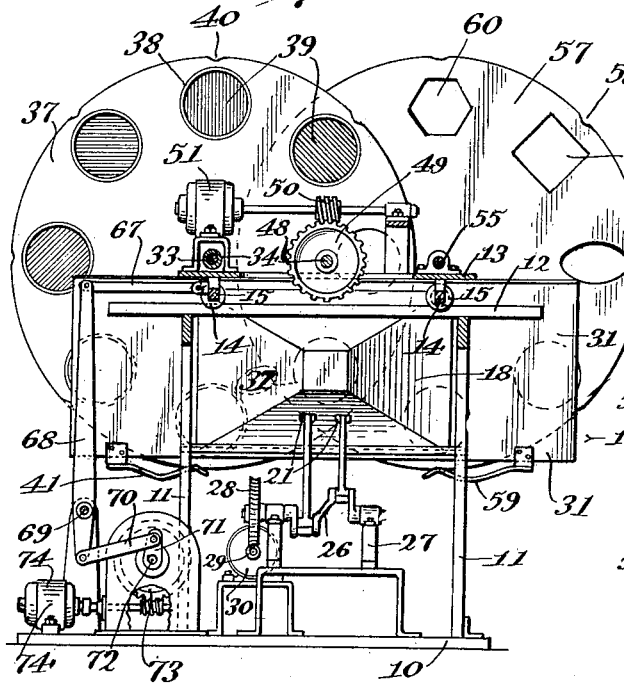
Fig. 5 is a section on a reduced scale on line 5—5 of Fig. 1.
Figure 6:
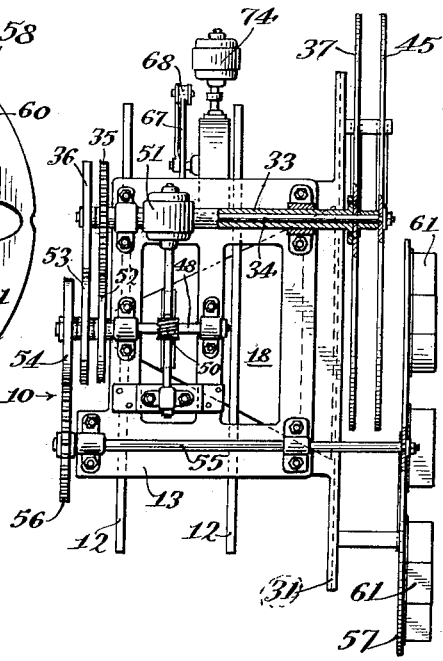
Fig. 6 is a top plan view of the apparatus with parts broken away and in section.

Referring by numerals to the accompanying drawings which illustrate a practical embodiment of my invention, 10 designates a base upon which is supported a suitable frame work including posts 11 and supported by said posts a suitable distance above base 10, is a pair of horizontally disposed parallel rails 12 that serve as a support for a horizontally moving frame.

This frame includes a horizontally disposed plate 13 and arranged on the underside of said plate is a pair of axles 14 on the ends of which are journaled small wheels 15 that bear directly upon the rails 12.

Brackets 16 are arranged on the underside of the rear portions of the axles 14 and said brackets carry rollers 17, that engage beneath the corresponding rail 12 directly below the rear pair of wheels 15.

The rollers 17 engaging the underface of the rear one of the rails 12, hold the traveling frame in proper position during its movement upon the rails 12.

Suitably supported by the upper portions of the posts or standards 11, is a housing 18, having the shape of a horizontally disposed pyramid, with its apex rearwardly presented and its front end open.

The inner surfaces of this housing may be polished or treated to form reflecting surfaces or suitable reflectors may be inserted within the housing.

In Fig. 1, I have illustrated a concave reflector 19 in the rear portion of housing 18 and a series of transversely disposed inclined reflectors 20 extending across the bottom of the housing.

Obviously the inner faces of the housing may be provided with various forms of reflecting surfaces and the latter may be inclined or curved and they may extend lengthwise of the walls of said housing or transversely thereof.

Figure 11:
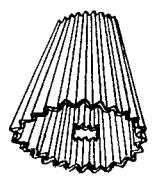
Fig. 11 is a perspective view of a modified form of reflector that is removably positioned in the main reflector housing of the apparatus.
Figure 7:
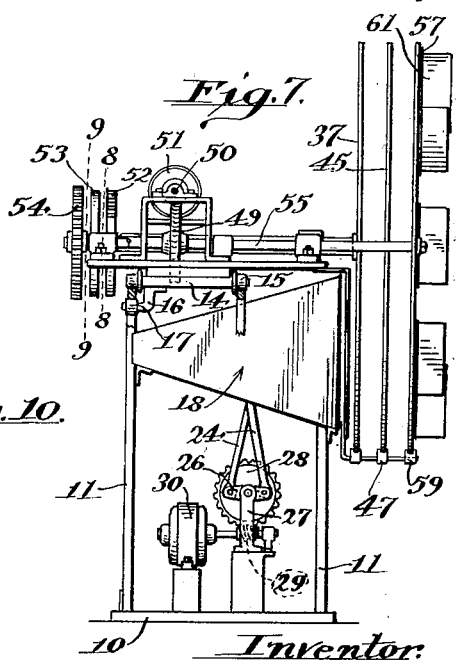
Fig. 7 is a side elevational view of the apparatus.

In Fig. 11 I have illustrated a reflecting member that is tapered lengthwise in order that it may be inserted in the housing 18 and said reflecting member being substantially oval or ovoid shape in cross section and with longitudinally disposed ribs.

Formed in the lower wall of housing 18 is an opening 21 and arranged on the bottom of the housing to the sides of this opening are bearings 22 for short horizontally disposed shafts 23 and arranged for sliding movement through each shaft, is a tubular arm 24 carrying on its upper end an electric lamp 25 and the conductors to which lamp extend through the tubular arm.

The lower ends of the arm 24 are journaled to the cranks of a crank shaft 26 that is mounted for rotation in suitable bearings 27 and carried by said crank shaft is a worm wheel 28. This worm wheel engages a worm 29 that is carried by the shaft of a small electric motor 30.

As a result of the construction just described, the lamps 25 carried by the upper ends of arms 24 will move through vertically disposed substantially oval paths of travel as motor 30 is operated and transmits motion through worm 29 and worm wheel 28 to crank shaft 26.

Depending from the front edge of plate 13 is a vertically disposed plate 31 in the center of which is formed an opening 32 and said opening being in direct horizontal alignment with the reflector 19.

Journaled in suitable bearings on top of plate 13 near one end thereof, is a horizontally disposed tubular shaft 33 and extending therethrough and adapted to rotate independently thereof, is a shaft 34.

Secured to the rear end of tube 33 is a gear wheel 35, and a mutilated gear wheel 36 is secured to the rear end of shaft 34.

Secured to the forward end of tubular shaft 33, is a disc 37 and formed therein adjacent to its edge and spaced at equal distances apart, are openings 38 in which are located sections of differently colored transparent material 39, preferably glass or non-inflammable celluloid.

Formed in the edge of disc 37, immediately adjacent to each opening therein, is a shallow notch 40, that is adapted to receive the free end of a resilient detent 41 and which latter is secured to the lower portion of plate 31.

The diameter of disc 37 is such that during its rotation, the opening 38 containing the sections of colored transparent material are successively brought into horizontal alignment with the reflector 19 and opening 32 that is formed in plate 31.

As illustrated in Figs. 1 and 2, I prefer to mount the sections 39 of colored transparent material in a ring-shaped frame 42 and which latter are arranged to rotate freely in the openings 38 and secured to each frame 42 by means of a set screw 43, is a counter-balancing weight 44. As long as the set screw 43 is loose, the frame 42 will roll within its bearing and said frame and the colored transparent section carried thereby, will maintain its relative position regardless of the rotation of disc 37, but when the set screw is tightened, frame 42 will be locked to its bearing on the disc 37 and it will rotate as an integral part thereof and without changing its position relative thereto.

In some instances the frames 42 may contain a plurality of strips, of differently colored glass or other transparent material as illustrated in Fig. 2.

Secured on the forward end of shaft 34 and positioned immediately in front of disc 37, is a disc 45 carrying a series of lenses 46 and the latter being disposed so that as the disc rotates they will successively occupy positions directly in horizontal alignment with the reflector 19 and the opening 32 and consequently said lenses will align with the sections of transparent colored material 39 that are carried by the frames 42.

Formed in the edge of disc 45 are shallow notches similar to the notches 40 in disc 37 and these notches are adapted to receive the free ends of resilient detents 47, that are supported by plate 31.

The resilient detents 41 and 47 engage successively in the notches in discs 37 and 45 for the purpose of holding said discs immovable during their periods of rest and while one of the colored transparent sections 39 and one of the lenses 46 are in horizontal alignment with reflector 19 and opening 32.

Journaled in suitable bearings on top of plate 13 and disposed parallel with shaft 34 and the tubular shaft 33, is a shaft 48, carrying a worm wheel 49 and meshing therewith is a worm 50 that is carried by the shaft of a small electric motor 51.

Figure 8:
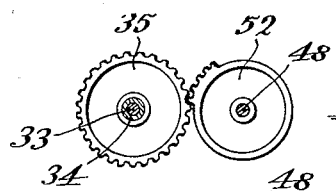
Fig. 8 is a detail section taken on the line 8—8 of Fig. 7.
Figure 9:
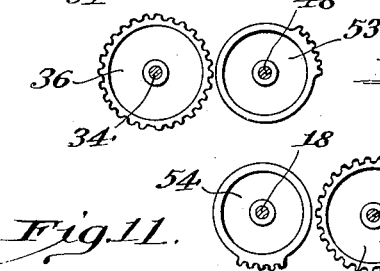
Fig. 9 is a cross section taken on the line 9—9 of Fig. 7.
Figure 10:
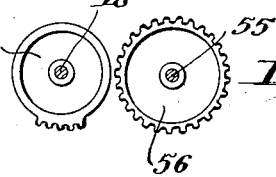
Fig. 10 is an elevational view looking in the direction indicated by the arrow 10 in Fig. 6.

Secured on the rear end of shaft 48 are three mutilated gear wheels 52, 53 and 54 and the toothed portions of these gear wheels are disposed substantially 120° apart, as illustrated in Figs. 8, 9 and 10.

The teeth of mutilated gear wheel 52 mesh with the teeth of gear wheel 35 and the teeth of mutilated gear wheel 53 mesh with the teeth of gear wheel 36.

Journaled in suitable bearings on top of plate 13 and on the opposite side thereof from the shafts 33 and 34, is a shaft 55 carrying on its rear end a gear wheel 56, with which meshes the teeth of mutilated gear wheel 54.

Carried by the forward end of shaft 55, and occupying a vertical plane just in front of the vertical plane occupied by disc 45, is a disc 57 that is provided in its edge with shallow recesses 58 that are adapted to receive a resilient detent 59 and the latter being supported from plate 31.

Formed into disc 57 and spaced equal distances apart, are openings 60, which may vary in size and shape, as illustrated in Fig. 5 and these openings are located immediately adjacent to the notches 58 in the edge of said disc.

Secured to the outer face of disc 57 and surrounding each opening 60 therein, is a housing 61, provided with polished reflecting inner surfaces and arranged for sliding movement in the forward portion of each housing 61, is a panel 62, which when closed cuts off the passage of light rays through the opening 60 and its housing 61.

Openings 60 are located so that during rotation of disc 57 they will successively align with opening 32 and reflector 19.

Carried by a shaft 63 that is arranged coaxial with shaft 55, is a disc 64, carrying a series of spaced condenser lenses such as 66 and which latter are adapted as disc 64 is rotated to align with opening 32 and reflector 19.

Shaft 63 may be driven from motor 51 and the driving means associated therewith, or said shaft may be driven by a separate motor or other driving means.

Pivotally connected to one end of the reciprocating frame that includes plate 13, is a link 67, to the outer end of which is connected the upper end of a lever arm 68, the latter being fulcrumed at 69 to a suitable bracket in the lower portion of the apparatus and pivotally connected to the lower end of arm 68 is one end of a link 70. The opposite end of this link is journaled on a short crank arm 71 that is carried by a shaft 72 and which shaft is rotated in any suitable means, preferably by means of worm gearing 73 that is driven by a small electric motor 74.

During operation of my improved illuminating appliance, the motors 30, 51 and 74 are simultaneously operated and motor 74, through the connections 73, 72, 71, 70, 68 and 67, impart reciprocatory movement to the frame that includes plate 13 and during such reciprocation the wheels 15 ride backward and forward on rails 12 and all parts carried by the reciprocating frame, move laterally with respect to the base of the appliance and the fixed housing 18.

As motor 30 operates, the connections 29 and 28 impart reciprocating movement to the tubular arms 24 so that the lamps 25 carried by said arms are caused to travel through vertically disposed substantially oval paths and as a result constant change in position of the lamps, the angle of the light rays reflected by reflector 19 and the reflecting surfaces within the housing 18, is constantly changing.

Motor 51, through the connections 50 and 49 imparts continuous rotary motion to shaft 48 and the three mutilated gears 52, 53 and 54, and these gears successively engage and partially rotate gear wheels 35, 36 and 56 respectively.

Thus the tubular shaft 33 and shafts 34 and 55 are intermittently rotated in succession and the gearing is arranged so that the discs 37, 45 and 57 move a sufficient distance to bring one of the sections 39 of transparent material, one of the lenses 46, one of the openings 60 and one of the condenser lenses 66 into horizontal alignment with each other and with the opening 32 and the reflector 19 and when so aligned the rotating discs are retained in fixed positions by the engagement of the respective detents in the corresponding notches in the edges of the rotating discs.

While the discs are at rest and one of the colored transparent sections 39 is in alignment with one of the lenses 46, one of the openings 60 and one of the condenser lenses, the direct and reflected rays of light from the lamps 25 will pass through opening 32, thence through the colored transparent section 39, thence through lens 46, thence through opening 60, wherein certain of the light rays will strike against the reflecting surfaces within housing 66 and these light rays will then pass through condenser lens 66 into the area or the object to be illuminated and consequently producing the desired results.

The panel 16 may be adjusted so as to control the volume of light rays that pass through the opening 60 and housing 61 and by using condenser lenses 66 having different focal lengths, the projected light rays may be concentrated or diffused to varying degrees.

Various forms of reflectors may be utilized within the housing 18 and in Fig. 11 I have shown a tapered reflector that is adapted to be positioned within the housing and which reflector is substantially ovoid in cross section and provided with longitudinally disposed ribs or corrugations.

Other forms of reflectors may be interchangeably utilized in the housing 18 to produce different results.

Certain of the light rays that pass through the housings 61 will impinge against the reflecting inner surfaces thereof and from said surfaces the light rays will be directed outwardly through the condenser lenses 66 which may vary in focal length so that very pleasing diffusion and combination of colored light rays will be produced.

The openings 60 and the housings 61 surrounding same, may be of different shapes, as illustrated in Fig. 5, so as to produce different pleasing effects.

Thus it will be seen that I have provided an illuminating appliance that is relatively simple in construction and which in operation produces a variety of pleasing illuminating effects that may be advantageously employed for a wide variety of purposes and particularly for the interior and exterior illumination of buildings, for illuminating goods on display and for theatrical and motion picture purposes.

It will be understood that minor changes in the size, form and construction of the various parts of my improved illuminating appliance may be made and substituted for those herein shown and described without departing from the spirit of my invention, the scope of which is set forth in the appended claims.

I claim as my invention:

1. In an illuminating appliance, a housing provided on its interior with reflecting surfaces, a plurality of sources of light arranged for continuous reciprocating movement in opposite directions within said housing, a carrier arranged for operation in front of said housing and a plurality of sections of colored transparent material carried by said carrier.

2. An illuminating appliance as set forth in claim 1, with means for intermittently moving said carrier to successively bring the sections of colored transparent material into position in front of said housing.

3. An illuminating appliance as set forth in claim 1, with a carrier arranged for operation in front of said first mentioned carrier and a plurality of lenses carried by said second mentioned carrier.

4. In an illuminating appliance, a housing provided on its interior with reflecting surfaces, a source of light arranged for movement within said housing, a series of three carriers arranged for operation in front of said housing, a plurality of sections of colored transparent material carried by one of said carriers, a series of lenses carried by another one of said carriers, a series of housings carried by a third one of said carriers and said housings being open at both ends and provided on their interiors with reflecting surfaces.

5. An illuminating appliance as set forth in claim 4, and with means for cutting out the passage of light rays through said housings.

6. An illuminating appliance as set forth in claim 4, and with a condenser lens arranged in front of the path of travel of said housings.

7. In an illuminating appliance, a housing provided on its interior with reflecting surfaces, a plurality of sources of light arranged for continuous reciprocating operation in opposite directions within said housing, a member arranged for reciprocatory movement adjacent to said housing, a carrier supported by said reciprocating member and positioned in front of said housing and a plurality of sections of colored transparent material carried by said carrier.

8. An illuminating appliance as set forth in claim 7, and with means for operating said carrier so as to successively position the sections of colored transparent material in front of said housing.

9. In an illuminating appliance, the combination with a reflector and a light arranged for movement within said reflector, of a rotatably mounted disc positioned in front of said reflector and a plurality of sections of colored transparent material arranged for independent movement upon said disc.

10. In an illuminating appliance, the combination with a reflector and a light arranged for movement within said reflector, of a rotatably mounted disc positioned in front of said reflector, a plurality of sections of colored transparent material arranged for independent movement upon said disc and a counterbalanced weight carried by each section of colored transparent material.

11. In an illuminating appliance, the combination with a reflector and a light arranged for movement within said reflector, of a rotatably mounted disc positioned in front of said reflector, a plurality of sections of colored transparent material arranged for independent movement upon said disc, a counterbalanced weight carried by each section of colored transparent material and means for securing each counterbalancing weight to the section of colored transparent material to which it is connected.

12. In an illuminating appliance, the combination with a reflector and a light arranged for movement within said reflector, of a rotatably mounted disc positioned in front of said reflector, a plurality of sections of colored transparent material arranged for independent movement upon said disc, a disc mounted for rotation in front of said first mentioned disc and a series of lenses carried by said second mentioned disc.

13. In an illuminating appliance, the combination with a reflector and a light arranged for movement within said reflector, of a rotatably mounted disc positioned in front of said reflector, a plurality of sections of colored transparent material arranged for independent movement upon said disc, a disc mounted for rotation in front of said first mentioned disc, a series of lenses carried by said second mentioned disc and means for intermittently rotating said discs.

14. In an illuminating appliance, the combination with a reflector and a light arranged for movement within said reflector, of a rotatably mounted disc positioned in front of said reflector, a plurality of sections of colored transparent material arranged for independent movement upon said disc, a disc mounted for rotation in front of said first mentioned disc, a series of lenses carried by said second mentioned disc, a third disc mounted for rotation in front of the first mentioned discs, said third disc being provided with a series of openings of different shapes, housings surrounding said openings and reflectors arranged within said housings.

15. In an illuminating appliance, the combination with a reflector and a light arranged for movement within said reflector, of a rotatably mounted disc positioned in front of said reflector, a plurality of sections of colored transparent material arranged for independent movement upon said disc, a disc mounted for rotation in front of said first mentioned disc, a series of lenses carried by said second mentioned disc, a third disc mounted for rotation in front of the first mentioned discs, said third disc being provided with a series of openings of different shapes, housings surroundings said openings, reflectors arranged within said housings and means for intermittently rotating all of said discs.

16. In an illuminating appliance, the combination with a source of light and a reflector associated therewith, of means for imparting simultaneous reciprocating and swinging movement to said source of light, a carrier arranged for operation in front of said reflector, said carrier being provided with a series of openings, housings arranged around said openings and reflectors arranged within said housings.

17. In an illuminating appliance, the combination with a source of light and a reflector associated therewith, of means for imparting simultaneous reciprocating and swinging movement to said source of light, a carrier arranged for operation in front of said reflector, said carrier being provided with a series of openings, housings arranged around said openings, reflectors arranged within said housings and means for controlling the passage of light rays through said housings.

18. In an illuminating appliance, the combination with a source of light and a reflector associated therewith, of means for imparting simultaneous reciprocating and swinging movement to said source of light, a carrier arranged for operation in front of said reflector, said carrier being provided with a series of openings, housings arranged around said openings, reflectors arranged within said housings and a condenser lens arranged in front of said carrier in horizontal alignment with said reflector and the openings in said carrier.

NICHOLAS C. AMEN.